(12) United States Patent  
Österling

(10) Patent No.: US 9,036,475 B2  
(45) Date of Patent: May 19, 2015

(54) METHOD AND ARRANGEMENT IN A DISTRIBUTED RADIO BASE STATION

(75) Inventor: Jacob Österling, Järfälla (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/003,119

(22) PCT Filed: Dec. 22, 2010

(86) PCT No.: PCT/SE2010/051457  
§ 371 (c)(1),  
(2), (4) Date: Jul. 9, 2012

(87) PCT Pub. No.: WO2012/087206  
PCT Pub. Date: Jun. 28, 2012

(65) Prior Publication Data  
US 2013/0258848 A1 Oct. 3, 2013

(51) Int. Cl.  
*H04W 28/02* (2009.01)  
*H04W 88/08* (2009.01)

(52) U.S. Cl.  
CPC ........ *H04W 28/0231* (2013.01); *H04W 88/085* (2013.01)

(58) Field of Classification Search  
None  
See application file for complete search history.

(56) References Cited

U.S. PATENT DOCUMENTS

| | | | |
|---|---|---|---|
| 6,792,274 B1 * | 9/2004 | Kapanen | 455/450 |
| 2009/0252108 A1 | 10/2009 | Watanabe | |
| 2010/0124933 A1 * | 5/2010 | Chowdhury et al. | 455/453 |
| 2010/0284316 A1 * | 11/2010 | Sampathkumar | 370/311 |
| 2011/0310941 A1 * | 12/2011 | Kenington | 375/220 |
| 2012/0057572 A1 * | 3/2012 | Evans et al. | 370/338 |

FOREIGN PATENT DOCUMENTS

| | | |
|---|---|---|
| EP | 1 926 228 A2 | 5/2008 |
| WO | 2008/022018 A2 | 2/2008 |

OTHER PUBLICATIONS

International Search Report issued in International Application No. PCT/SE2010/051457, dated Sep. 16, 2011.  
Written Opinion issued in International Application No. PCT/SE2010/051457.

* cited by examiner

*Primary Examiner* — Faruk Hamza  
*Assistant Examiner* — Diane Lo  
(74) *Attorney, Agent, or Firm* — Baker Botts, LLP

(57) ABSTRACT

In a method for use in a distributed radio base station, comprising a plurality of radio equipment nodes and an associated radio equipment control node, configuring at least one of the radio equipment nodes with a initial signal path configuration, and monitoring a traffic demand of a respective cell of each of the plurality of radio equipment nodes. Subsequently, determining an alternative signal path configuration for the at least one radio equipment node based on at least the monitored demand, and dynamically switching from the initial signal path configuration to the determined alternative signal path configuration. Finally, exchanging data between the radio equipment control node and the at least one radio equipment node based on the determined alternative signal path configuration.

19 Claims, 10 Drawing Sheets

METHOD AND ARRANGEMENT IN A DISTRIBUTED RADIO BASE STATION

This application is the U.S. national phase of International Application No. PCT/SE2010/051457, filed 22 Dec. 2010, which designated the U.S., the entire contents of which is hereby incorporated by reference.

TECHNICAL FIELD

The present invention relates to communication systems, and specifically to distributed radio base stations in such systems.

BACKGROUND

Conventional radio base stations are located adjacent to the antenna in a small but at the base of the antenna tower. Finding suitable sites can be a challenge because of the footprint required for the hut, the need for structural reinforcement of rooftops and the availability of both primary and backup power sources. In contrast to the conventional base stations, a recent approach has been the introduction of a so-called distributed radio base station architecture. In this case, the functionality of the radio base station is divided or distributed, wherein the radio frequency transceivers are separated from the rest of the base station and relocated next to their associated antennas such that the antennas are driven directly with minimal transmission power loss. The digital base band data is transported between the base band processing located in the central base station enclosure and the remotely located radio frequency transceivers over a flexible, loss-free optical fibre. Consequently, it is possible to remotely locate the radio frequency transceiver a significant distance from the main base station such that a single, central base station or base band "hotel" can centrally serve a large number of these remote radio frequency transceivers.

The Common Public Radio Interface (CPRI) is an initiative to define a publicly available specification that standardizes the protocol interface between the radio equipment control (REC) node and the radio equipment (RE) node in wireless distributed base stations. This allows interoperability of equipment from different vendors and preserves the software investment made by the wireless service providers. CPRI allows the use of a distributed architecture where base stations, containing the REC, are connected to the remote radio heads via lossless fibre links that carry the CPRI data. The architecture reduces cost for service providers because only the remote radio heads containing the RE need to be situated in environmentally challenging locations. The base stations can be centrally located in less challenging locations where footprint climate and availability of power are more easily managed. Typically, the CPRI links are between a REC node and a RE node, or between two RE nodes in a chain or cascade configuration. Various arrangements of RE nodes and a REC in a distributed base station topology are illustrated in FIG. 1. Radio equipment nodes are either directly or indirectly connected to the radio equipment control node. In order to reduce the number of fibers to a radio equipment control node, a plurality of radio equipment nodes can be connected to a common CPRI concentrator.

A general outline of the relation between a radio equipment control node and a radio equipment node is illustrated in FIG. 2. The two nodes are in communication via the previously mentioned CPRI interface, which includes a plurality of logical connections or data flows. These logical connections encompass a synchronization data flow for synchronization and timing information between nodes, a control and management (C&M) data flow for control data used for call processing and management information for operation, administration and maintenance of the CPRI link and nodes, and CPRI layer 1 control data. In addition, user plane data is transported in the form of IQ data. Several IQ data flows are sent via one physical CPRI link, wherein each IQ data flow reflects the data of one antenna for one carrier.

There is a growing interest in building large base band hotels and have distributed radio heads, using the aforementioned CPRI for transmission in between radio equipment control nodes and radio equipment nodes, as well as for transmission between radio equipment nodes. There is also a growing interest in using multiple antennas per sector e.g. eight antenna branches or more per radio equipment. The combination presents a tough challenge.

One problem with the above described base band hotel is the need for a very high speed interface between the base band hotel e.g. radio equipment control node and the remote radios e.g. radio equipment nodes. With future aggregation of LTE carriers, e.g. a combination of 8 or more antennas per sector and up to 50 MHz bandwidth, the resulting CPRI rate may reach up to 25 Gbps per radio head e.g. radio equipment node, and result in significant physical layer processing in the base band e.g. radio equipment control node.

As an example, changing from two to eight antennas per radio equipment node, would result in an increase in interface bit rates from 2 Gbps to 8 Gbps/radio equipment. In addition, changing bandwidth from 20 MHz to 50 MHz would cause an increase in CPRI interface traffic from 8 Gbps/RE to 20 Gbps/RE. Trying to uphold this type of interface bit rate is both costly and computationally challenging, not to mention the resource waste involved in maintaining the possibility to support those interface bit rates even when the traffic demand is low for a specific time period.

Based on the above mentioned problems, there is a need for an improved utilization of the radio resources in distributed radio base stations, whilst still maintaining at least a lowest acceptable service layer at all times.

SUMMARY

It is an object to obviate at least some of the above disadvantages and provide an improved distributed radio base station.

This and further object are met by embodiments as defined by the accompanying patent claims.

A first aspect of the present disclosure presents an embodiment of a method for use in a distributed radio base station, which distributed radio base station comprises a plurality of radio equipment nodes and an associated radio equipment control node. The radio equipment control node is separated from and coupled to said plurality of radio equipment nodes by a common transmission link. The method enables exchanging data between the radio equipment control node and the plurality of radio equipment nodes for transceiving information over a radio interface in a cell using multiple antenna elements. The method includes the steps of configuring at least one of the radio equipment nodes with a initial signal path configuration that defines a combination of at least one of a set of available signal paths to be mapped onto the multiple antenna elements and a bandwidth capability for the at least one radio equipment node, and monitoring a traffic demand of a respective cell served by each of the plurality of radio equipment nodes. Further, the method comprises the steps of determining an alternative signal path configuration for the at least one radio equipment node based on at least the monitored traffic demand, which alternative signal path configuration defines a different combination of at least one of a the set of available signal paths to be mapped onto one of the multiple antenna elements and a bandwidth capability for the at least one radio equipment node. Finally, the method includes the step of dynamically switching from the initial signal path configuration to the determined alternative signal path configuration, and exchanging data between the radio equipment control node and the at least one radio equipment node based on said determined alternative signal path configuration.

A second aspect of the present disclosure presents an embodiment a method in a radio equipment control node in a distributed radio base station, which distributed radio base station comprises a plurality of radio equipment nodes associated with the radio equipment control node, and the radio equipment control node is separate from and coupled to the plurality of radio equipment nodes by a common transmission link (CPRI). The method comprises the steps of determining and providing an initial signal path configuration to at least one of the associated radio equipment nodes, the signal path defines a combination of at least one of a set of available signal paths to be mapped onto multiple antenna elements associated with the at least one radio equipment node and a bandwidth capability for the radio equipment node, and monitoring a traffic demand for a respective cell of each of the plurality of associated radio equipment nodes. Further, the method comprises the steps of determining an alternative signal path configuration for the at least one radio equipment (RE) node based on at least the monitored traffic demand and an available set of signal paths and bandwidth capabilities for the radio equipment (RE) node. Finally, the method comprises the steps of providing the determined alternative signal path configuration to the at least one radio equipment (RE) node to instruct it to switch from the initial signal path configuration to the alternative signal path configuration, and exchanging data with the at least one radio equipment node based on the determined alternative signal path configurations.

A third aspect of the present disclosure presents an embodiment of a method in a radio equipment node in a distributed radio base station, which distributed radio base station comprises a plurality of radio equipment nodes associated with a radio equipment control node. The radio equipment control node is separate from and coupled to the plurality of radio equipment nodes by a common transmission link (CPRI). The method includes the steps of receiving and activating an initial signal path configuration, which initial signal path configuration defines a combination of at least one of a set of available signal paths to be mapped onto multiple antenna elements associated with the radio equipment node and a bandwidth capability for the radio equipment node, and receiving a provided alternative signal path configuration and activating a switch from the initial signal path configuration to the alternative signal path configuration. Further, the method comprises the steps of switching to and activating the provided alternative signal path configuration for transceiving information over a radio interface, and exchanging data with the radio equipment control node based on the one of a plurality of alternative signal path configurations.

A fourth aspect of the present disclosure presents an embodiment of a radio equipment node for use in a distributed radio base station that includes a radio equipment control node separate from and coupled to a plurality of radio equipment nodes by a communication link. The radio equipment node comprises multiple antenna elements for transceiving information over a radio interface and at least one interface (CPRI) configured for communication with the radio equipment control node. Further, the radio equipment node includes a signal path configuration receiver configured to receive and activate a provided initial signal path configuration, the signal path configuration defines a combination of at least one of a set of available signal paths to be mapped onto the multiple antenna elements and a bandwidth capability for the radio equipment node. In addition, the radio equipment node includes a switch configured to switch from an activated initial signal path configuration to an alternative signal path configuration in response to a received alternative signal path configuration, and a transceiver configured for exchanging data with the radio equipment control node based on the alternative signal path configuration.

A fifth aspect of the present disclosure presents embodiments of a radio equipment control node for use in a distributed radio base station that includes a plurality of radio equipment nodes with multiple antenna elements. The radio equipment control node is separate from and coupled to the plurality of radio equipment nodes by a common transmission link, and comprises a common transmission interface defining a common transmission protocol for the common transmission link. Further, the radio equipment control node includes a signal path configuration determinator for determining and providing an initial signal path configuration to at least one of the plurality of radio equipment nodes, the signal path configuration defines a combination of at least one of a set of available signal paths to be mapped onto multiple antenna elements associated with the at least one radio equipment node and a bandwidth capability for the at least one radio equipment node. In addition, the radio equipment control node includes a traffic demand monitor for monitoring a traffic demand for a respective cell of the at least one radio equipment node, and a dynamic signal path configuration determinator for dynamically determining an alternative signal path configuration for the at least one radio equipment node based on at least the monitored traffic demand and optionally at least one of an available set of signal path configurations for the radio equipment node. Further, the radio equipment control node includes a signal path configuration control for providing the determined alternative signal path configuration to the at least one radio equipment node to instruct the at least one radio equipment node to switch from the initial signal path configuration to the alternative signal path configuration, and a transceiver configured for exchanging data with the at least one radio equipment node based on the alternative signal path configuration.

A sixth aspect of the present disclosure presents embodiments of a distributed radio base station including a radio equipment control node and a plurality of radio equipment nodes according to the previous aspects.

The embodiments of the present disclosure supports saving bandwidth on the interface between radio equipment control nodes and radio equipment nodes in distributed radio base stations by dynamically switching between signal path configurations e.g. signal paths and bandwidths for each associated radio equipment node based on monitoring a traffic demand of each cell or sector, especially when the radio equipment utilize adaptive antennas. In addition, the base band processing of the radio equipment control node is reduced.

Other advantages offered by the invention will be appreciated when reading the below description of embodiments of the invention.

BRIEF DESCRIPTION OF THE DRAWINGS

The invention, together with further objects and advantages thereof, may best be understood by referring to the following description taken together with the accompanying drawings, in which.

ABBREVIATIONS

C&M Control and Management
CDMA Code Division Multiple Access
CPRI Common Public Radio Interface
DL DownLink
FFT Fast Fourier Transformation
IFFT Inverse Fast Fourier Transformation
IQ data In-phase and Quadrature complex data
LTE Long Time Evolution
MIMO Multiple Input Multiple Output
REC Radio Equipment Control
RE Radio Equipment
TDM Time Division Multiplexing
UL UpLink
WCDMA Wideband Code Division Multiple Access
WDM Wavelength Division Multiplexing
WiMax Worldwide Interoperability for Microwave Access

DETAILED DESCRIPTION

Figure 1:
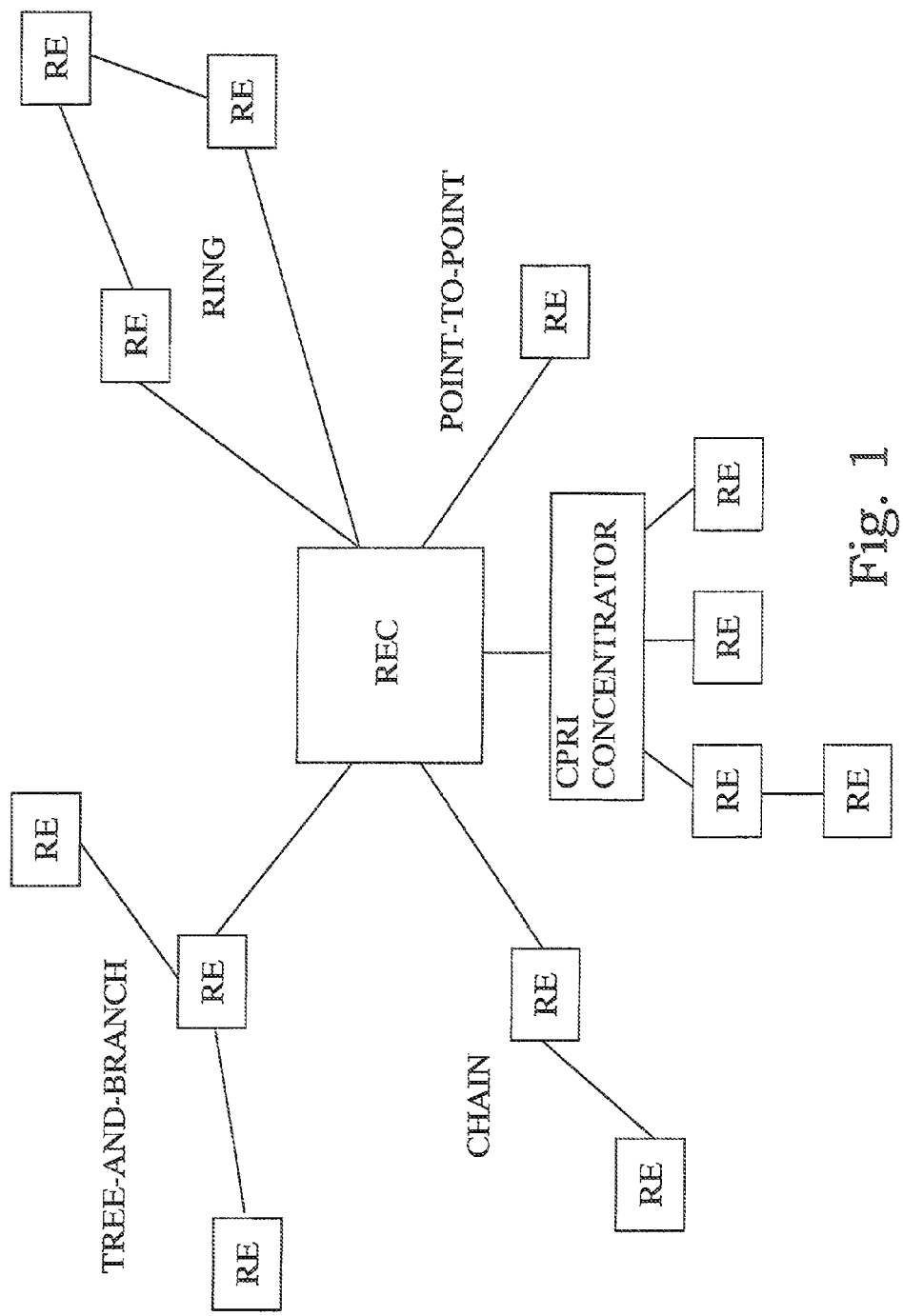
FIG. 1 is a schematic illustration of a distributed radio base station.
Figure 2:
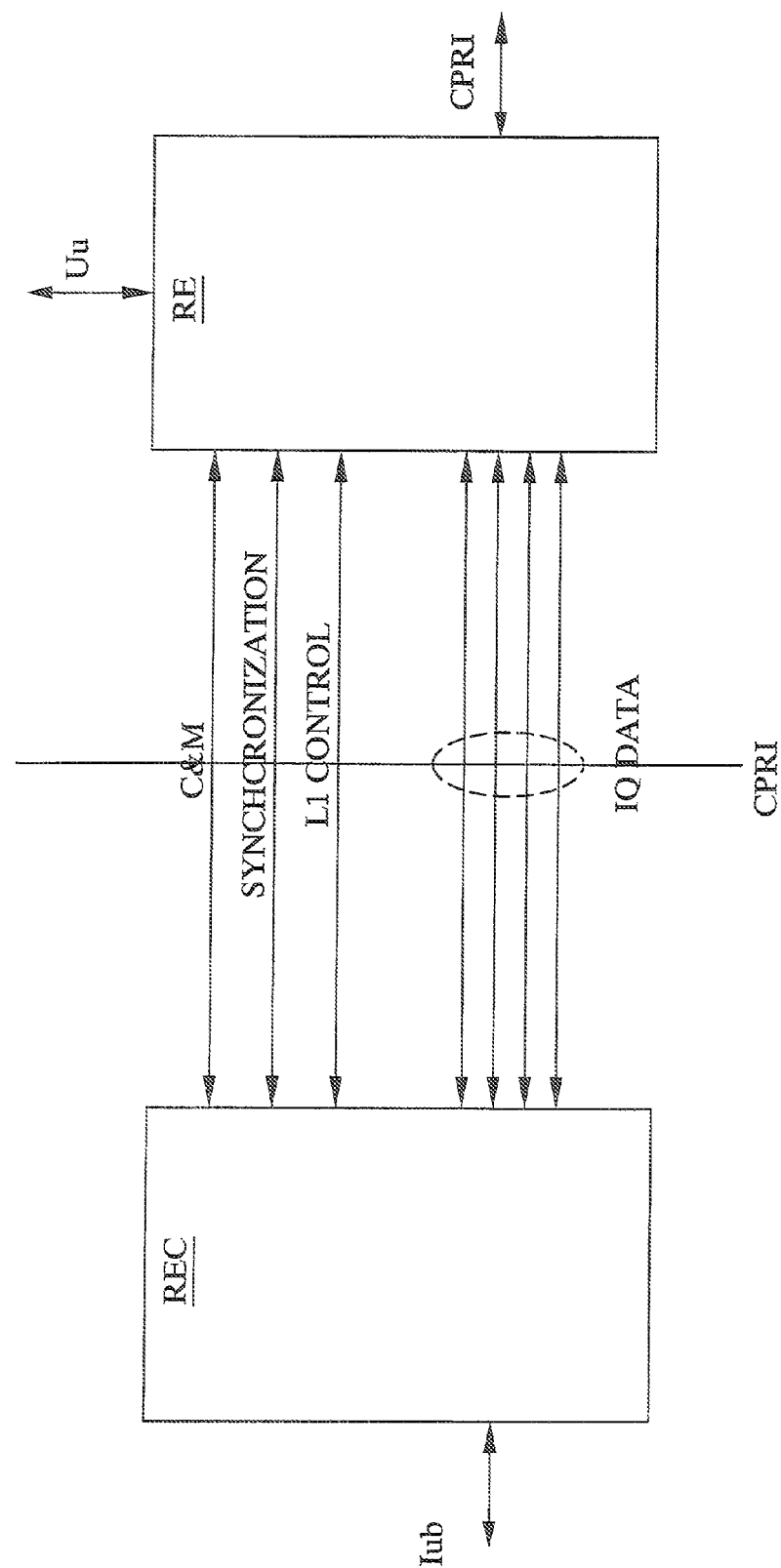
FIG. 2 is an illustration of the logical connections between a prior art radio equipment control node and a prior art radio equipment node.

The embodiments of the present disclosure will be described in the context of a general radio base station as shown in FIG. 1, where the distributed radio base station comprises a plurality of radio equipment (RE) nodes and an associated radio equipment control (REC) node and the radio equipment control (REC) node is separate from and coupled to the plurality of radio equipment (RE) nodes by a common transmission link (CPRI). As is implied, each radio equipment node is also transparent to e.g. merely forwards control signaling between a linked radio equipment node and the radio equipment control node.

The present disclosure mainly discusses LTE (Long Time Evolution) R9, i.e. up to eight antennas, two MIMO layers, and up to 20 MHz. However, the same reasoning is of course possible for eight layers and up to 100 MHz, as well as for other cellular systems supporting multiple carriers, multiple bandwidth options and/or beam forming, such as WCDMA CDMA2000 and WiMax.

Basically, the embodiments of the present disclosure enables a base band hotel e.g. radio equipment control (REC) node in a distributed radio base station to select and switch, on sub frame basis e.g. millisecond basis, the bandwidth and the number of independent antenna streams e.g. virtual signal paths, to be used in a sector or cell and to provide this information to the radio head e.g. radio equipment (RE) node responsible for that sector. Based on the provided selection, the radio equipment node extracts (downlink DL) or inserts (uplink UL) the necessary IQ samples from (DL) or to (UL) the CPRI interface. The more bandwidth and more antennas selected, the more samples are inserted/retrieved into/from the CPRI interface. This enables a pooling gain for the CPRI interface since one interface could be cascaded to multiple radio equipment, and each radio equipment node dynamically extracts or inserts the information that the base band hotel e.g. radio equipment control (REC) node deemed necessary to serve the user equipment in a particular cell or sector at that time instant. In addition, the physical layer processing in the base band hotel can be likewise pooled.

The information about selected bandwidth and virtual signal paths to be used in a sector can be provided explicitly, by directly signaling the selected bandwidth and virtual signal path, or implicitly by utilizing a predetermined signaling scheme.

To enable a more in-depth understanding of the problems of prior art and the benefits of the embodiments of the present disclosure, a detailed discussion about some key concepts is included below.

The already mentioned CPRI is a TDM interface, typically consisting of basic frames of 1/3.84 μs duration. During each such CPRI basic frame, user data in the form of a number of IQ samples are transmitted. Although packet transport of IQ samples are supported on CPRI, the most commonly used transport is to TDM IQ streams on the CPRI interface. Typically, for 4915.2 Mbps CPRI, 32 IQ slots of 30 bits each are available, and typically, a 20 MHz LTE stream uses eight slots. A 4915.2 Mbps CPRI can thus be used for transferring four antennas of 20 MHz each. The bit rate scales linearly with the air interface bandwidth, and linearly with the number of streams (antennas). The antenna stream is sometimes denoted the signal path.

The protocol for controlling the CPRI interface supports cascading of radio units, e.g. see FIG. 1. This is important in order to reduce the total number of fibers going from a radio site (typically 3 sectors) to a central base band site. In addition, CPRI also support tree structures to concentrate CPRI from different sites. Other structures that are supported for CPRI are point-to-point and ring structures. In all those cases, one feature necessary is the ability for a radio equipment node to be transparent to control signaling and data streams to and from a radio equipment control node intended for a linked radio equipment node, e.g. there needs to be a CPRI interface also between linked radio equipment nodes.

Today CPRI is specified for up to 10 Gbps per physical link. The present disclosure applies both to single physical link, but also to the case where a concentrator or RE works on a set of CPRI links, so called extension links. For instance, eight wavelengths could be multiplexed onto a 10 Gbps interface to a concentrator which then fans out on 20 single wavelength 10 Gbps interfaces. The invention then applies to both the WDM CPRI and each single wavelength CPRI.

To get maximum capacity in a cell or sector, it is important to be able to steer and shape the antenna beam to maximize the radiated power in the direction of a target user equipment. Only the base band or radio equipment control node knows the direction of each UE, so to get perfect steering, the base band needs to have full access to all eight antenna streams, to set the individual phase of each column. Different user equipment can have different beams, at the same time. The broadcast data, as well as reception of RACH, uses a set of phases to accomplish an antenna pattern covering the whole cell. An eight branch antenna system thus uses eight signal paths.

In prior art it is necessary to, for the downlink, perform IFFT for each signal path to generate IQ samples, and this needs to be performed regardless of if there is any traffic at all. Any changes to signal path configurations for an RE node are performed only in case of installation of new fibre, re-installation of a radio equipment, or redesigning the cell map.

The larger the air interface bandwidth of a radio equipment node, the more IQ samples is allocated every CPRI basic frame. Consequently, by using the embodiments of the present disclosure, it is possible to decrease the bandwidth for cells or sectors with little traffic. It is not viable to reduce the bandwidth to zero since there needs to be capacity for transmitting cell specific data such as broadcast and RACH detection. Changing bandwidth typically requires a reconfiguration of the cell, and all user equipment have to perform a new attach. However, in e.g. LTE R10 and multi-carrier WCDMA this can be solved by having multiple component carriers, and reducing bandwidth by shutting down one or more component carriers. For cells with little traffic, there is less need to have individually controlled antenna beams. Therefore, a predefined radiation pattern can be used for all users in a cell, preferably the same pattern as for cell global control patterns.

According to a basic embodiment of the present invention, a radio equipment control node can configure a radio equipment node to have multiple logical signal paths and then select on sub frame basis, which logical signal path to use for transceiving signals over a radio interface between the radio equipment and a user equipment. Thereby, each signal path is configured with where in the CPRI data field to pick up or insert samples and how to map the samples onto the antennas in the radio equipment node. In addition, each signal path is characterized by a bandwidth capability. The combination of a signal path and a bandwidth are referred to as a signal path configuration in this disclosure, also the term mode of operation may be used.

An embodiment of a general method, according to the present disclosure, for exchanging data between the radio equipment control (REC) node and the plurality of radio equipment (RE) nodes for transceiving information in a cell over a radio interface using multiple antenna elements, will be described with reference to FIG. 3. Basically, according to the embodiment, the method comprises dynamically switching S40 from a first or initial signal path configuration to one of a plurality of alternative signal path configurations for at least one of the plurality of radio equipment (RE) nodes based at least on a monitored traffic demand in a respective cell served by the radio equipment (RE) node, each such signal path configuration represents a combination of at least one of a set of available signal paths to be mapped onto the plurality of antenna elements available to the at least one radio equipment node and a bandwidth capability for the at least one radio equipment (RE) node. Finally, user data S50 is exchanged between the radio equipment control (REC) node and the at least one radio equipment (RE) node based on the one of a plurality of alternative signal path configurations.

The available signal path configurations can be signaled from the radio equipment (RE) node or provided upon request from the radio equipment control (REC) node during session initiation between the two.

In prior art systems, a radio equipment node with eight antenna ports or elements is configured with eight signal paths, each with a one-to-one mapping to a physical antenna port. Depending on the configuration, the bandwidth is one of 5, 10, 15, 20 MHz occupying 2, 4, 6 or 8 IQ slots in a CPRI basic frame. The IQ placement is configurable, e.g. which IQ slot to pick each of the 2, 4, 6 or 8 samples. This configuration is static and applied upon session initiation and cannot be changed during an ongoing session or on ms basis.

Based on an embodiment of the present disclosure, additional virtual signal paths or signal path configurations are added as well as additional control signaling to indicate desired signal path configurations. Examples of such signal path configurations are:

8 signal paths with a one-to-one mapping to a physical antenna, with lower bandwidth than prior art;
2 signal paths which are mapped to cell global antenna patterns with full bandwidth;
2 signal paths which are mapped to cell global antenna patterns with a small bandwidth, e.g. 5 MHz.

The combination of prior art and the above example would result in an available signal path set including four different sets to be selected each sub frame. In case of a heavy traffic load or demand in a cell, the radio equipment control node can choose to use the first set, with direct access to all physical antennas and full bandwidth. Thereby the radio equipment control node can utilize optimal beam steering per user. For a case of medium traffic demand, the radio equipment control node can either chose to do full beam steering with medium bandwidth, or send data on the full bandwidth with limited beam steering. The first alternative gives better spectrum efficiency, but will also require a cell reconfiguration. Finally, for the case of low traffic, e.g. during night time, the radio equipment control node can send on low bandwidth and only using cell global patterns.

Consequently, the radio equipment control node is able to choose an antenna stream or signal path and bandwidth arrangement based on traffic load or demand in one or a subset of all cells. Some selections can be done without reconfiguration of the cell, whereas other requires a reconfiguration. This allows the radio equipment control node to choose how to use the CPRI bit rate in an optimal way based on traffic demand in each cell as well as its own physical processing limitations, and thus get CPRI bit rate pooling gain.

Figure 3:
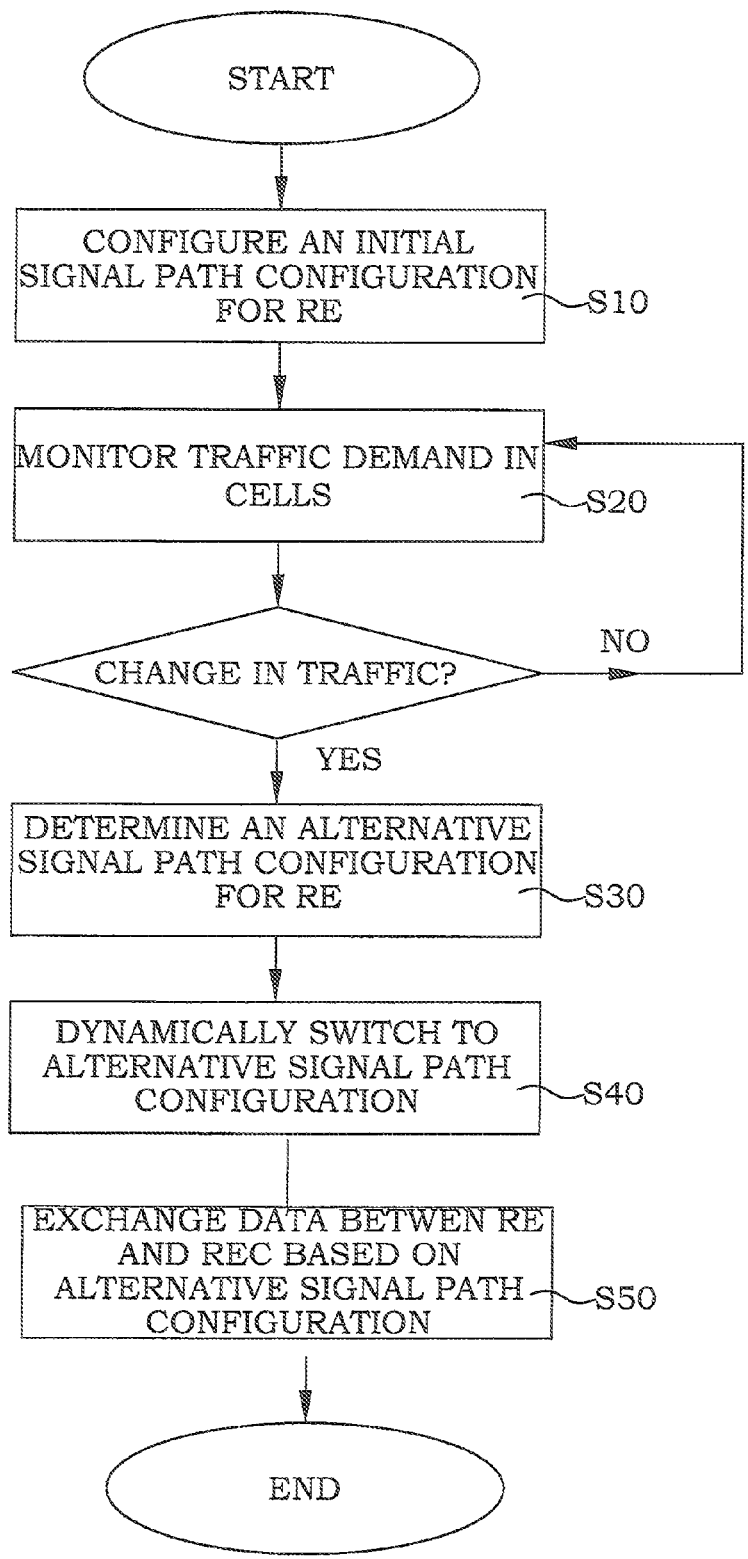
FIG. 3 is a flow diagram of an embodiment of a method according to the present disclosure.

According to a further embodiment of the present disclosure, also with reference to FIG. 3, a method for use in a distributed radio base station includes the following steps. Initially, at least one of the radio equipment (RE) nodes is configured S10 with a first or initial signal path configuration comprising a combination of at least one of a set of available signal paths to be mapped onto the multiple antenna elements of the radio equipment node and a bandwidth capability for the at least one radio equipment (RE) node. According to known measures, data e.g. IQ samples are exchanged across the CPRI link between the radio equipment control node and the radio equipment node utilizing the initial signal path configuration. Meanwhile, a traffic demand of a respective cell served by each of the plurality of radio equipment (RE) nodes is monitored S20. At some point in time, the traffic demand monitoring results in a decision that a more optimal signal path configuration can be utilized in one of the radio equipment nodes. The beneficial influence can be limited to the actual radio equipment node, or apply to the entire radio base station or a subset of the associated radio equipment nodes. Accordingly, an alternative signal path configuration is determined S30 for the at least one radio equipment (RE) node based on at least the monitored traffic demand. The alternative signal path configuration comprises a different combination of at least one of the set of available signal paths to be mapped onto of the multiple antenna elements and a bandwidth capability for the at least one radio equipment (RE) node. In response to the determined alternative signal path configuration, a dynamical switch from the initial signal path configuration to the determined alternative signal path configuration is performed, Finally, data is exchanged S50 between the radio equipment control (REC) node and the at least one radio equipment (RE) node based on the determined alternative signal path configuration.

The traffic demand can be monitored continuously, to enable switching of signal path configurations on ms basis, or at predetermined intervals, albeit regular or irregular intervals. In case of a rapid change or large increase or decrease in traffic for a cell, it may be necessary to monitor the demand at closer intervals. In case of a nonexistent or very small change in traffic demand, it may be more convenient to perform traffic demand monitoring more seldom. Consequently, the traffic monitoring can be controlled based on a relative change in traffic demand, either per radio equipment node, or for a subset or all of the radio equipment associated with a radio equipment control node.

According to a particular embodiment of the present disclosure, the dynamical switching S40 from the initial signal path configuration to the determined alternative signal path configuration is performed in response to a change in traffic demand in a cell, albeit an increase or decrease or other change. An alternative signal path configuration can be determined and switched to for one or a subset of all radio equipment nodes in the distributed radio base station in order to optimize allocation of interface resources and physical processing resources between the plurality of radio equipment nodes.

In the disclosure the terms initial and alternative signal path configurations can be exchanged with first and second signal path configurations since the switch can take place from any active signal path configuration, not only an initially activated signal path configuration.

According to another embodiment of the present disclosure, the available signal paths comprise one or a combination of physical signal paths or virtual signal paths. A physical signal path is where one data stream is mapped onto each respective of the plurality of antenna elements, e.g. the antennas are controlled individually and separately. A virtual signal path is where each data stream is mapped onto all or a subset of the plurality of antenna elements. An example of a virtual signal path pair is where a first data stream is mapped onto each of a first subgroup of the plurality of antenna elements, and second data stream is mapped onto each of a second subgroup of the plurality of antenna elements. The virtual paths can also be arranged to enable beam forming.

The above described embodiments are all aimed at an overall function of a distributed radio base station; in the following a number of embodiments of the actual implementation in a respective radio equipment control (REC) node and an associated radio equipment (RE) node will be presented.

Figure 4:
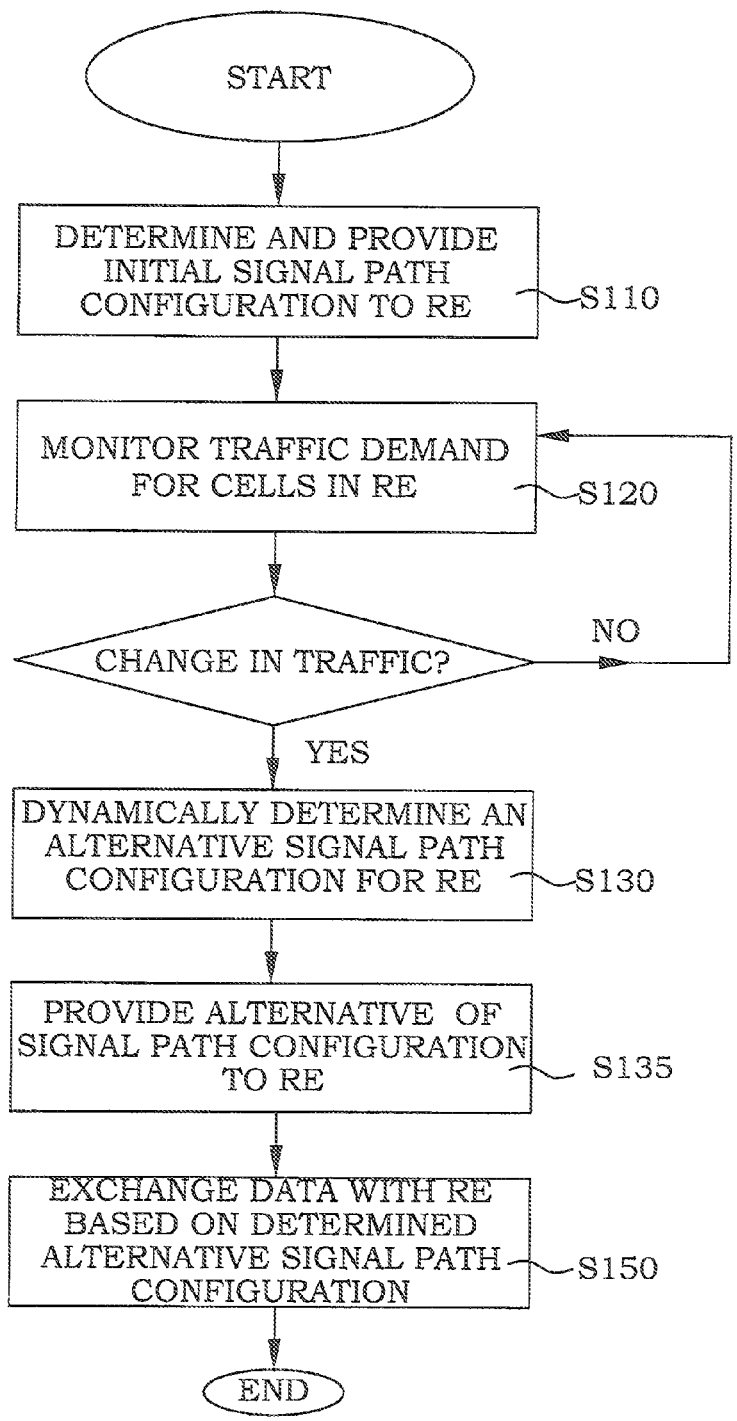
FIG. 4 is a flow diagram of an embodiment of a method in a radio equipment control node according to the present disclosure.

With reference to FIG. 4, an embodiment of a method in a radio equipment control (REC) node in a distributed radio base station will be described. As described previously, the distributed radio base station includes a plurality of radio equipment (RE) nodes associated with the radio equipment control (REC) node, and the radio equipment control (REC) node is separate from and coupled, directly or indirectly, to the plurality of radio equipment (RE) nodes by a common transmission link (CPRI).

According to the embodiment, initially the radio equipment control (REC) node determines S110 and provides an initial or first signal path configuration to at least one of its associated radio equipment (RE) nodes, the signal path represents a combination of at least one of a set of available signal paths to be mapped onto multiple antenna elements associated with the at least one radio equipment (RE) node and a bandwidth capability for the radio equipment node. This initial signal path configuration can optionally be defined as a default or minimum signal path configuration, which enables at least a minimum of service to all user equipment associated with the plurality of radio equipment nodes. A session of data exchange between the radio equipment control node and the at least one radio equipment node is conducted according to the initial signal path configuration. At the same time, continuously or at predetermined intervals, the radio equipment control node monitors S120 a traffic demand for a respective cell or sector of each of the plurality of associated radio equipment (RE) nodes, and dynamically determines S130 an alternative signal path configuration for the at least one radio equipment (RE) node based on at least the monitored traffic demand and an available set of signal paths and bandwidth capabilities for the radio equipment (RE) node. Subsequently, the determined alternative signal path configuration is provided S135 to the at least one radio equipment (RE) node to instruct it to switch signal path configuration and exchange data S150 with the at least one radio equipment (RE) node based on the determined alternative signal path configuration.

The traffic demand indicates the need for bandwidth and/or antenna beam forming within the cell. The bandwidth need is typically based on the number of bits to be transferred in the cell. The beam forming need is typically based on the necessity to form narrow beams in the cell due to interface reduction to neighbouring cells (DL), interference reduction to the users within the cell (UL), or need for additional antenna gain to the users within the cell.

The alternative signal path configurations or modes of operation can be determined based on provided available signal path configurations from the radio equipment node, or based on a predetermined set of mandatory available signal path configurations of each radio equipment node. In addition, physical processing limitations of the radio equipment control node can be taken into account.

Figure 5:
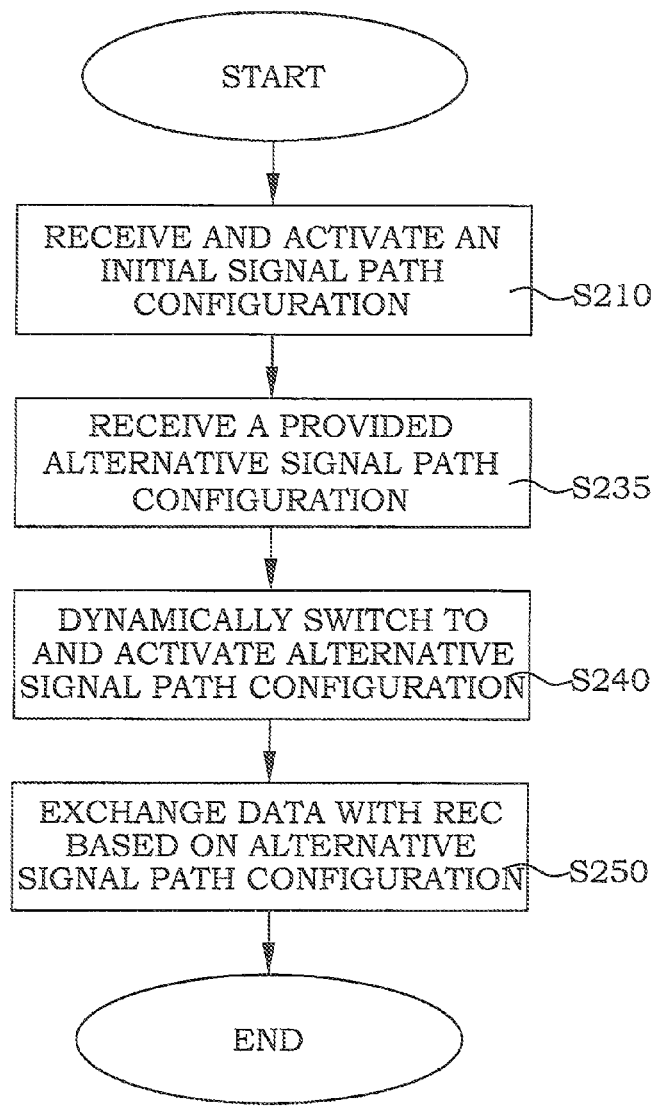
FIG. 5 is a flow diagram of an embodiment of a method in a radio equipment node according to the present disclosure.

In a corresponding manner, an embodiment of a method for use in a radio equipment node will be described below, with reference to FIG. 5.

The embodiment method in a radio equipment (RE) node in a distributed radio base station comprises the radio equipment (RE) node receiving and activating S210 an initial signal path configuration for exchanging data across the common transmission link between the radio equipment node and the radio equipment control node. The signal path configuration represents a combination of at least one of a set of available signal path configurations to be mapped onto multiple antenna elements associated with the radio equipment (RE) node and a bandwidth capability for the radio equipment (RE) node. Subsequently, the radio equipment (RE) node receives S235 a provided alternative signal path configuration, which orders or instructs the radio equipment node to dynamically switch from its initial signal path configuration to the alternative signal path configuration. In response to the provided alternative signal path configuration the radio equipment node switches S240 to and activates the alternative signal path configuration for transceiving information over a radio interface. Finally, the radio equipment node exchanges data S250 e.g. IQ samples with the radio equipment control (REC) node based on the one of a plurality of alternative signal path configurations.

The exchange of data comprises, depending on if it is a case of uplink or downlink, that the radio equipment inserts or extracts IQ samples into or out of the CPRI based on the provided signal path configuration (initial or alternative).

Figure 6:
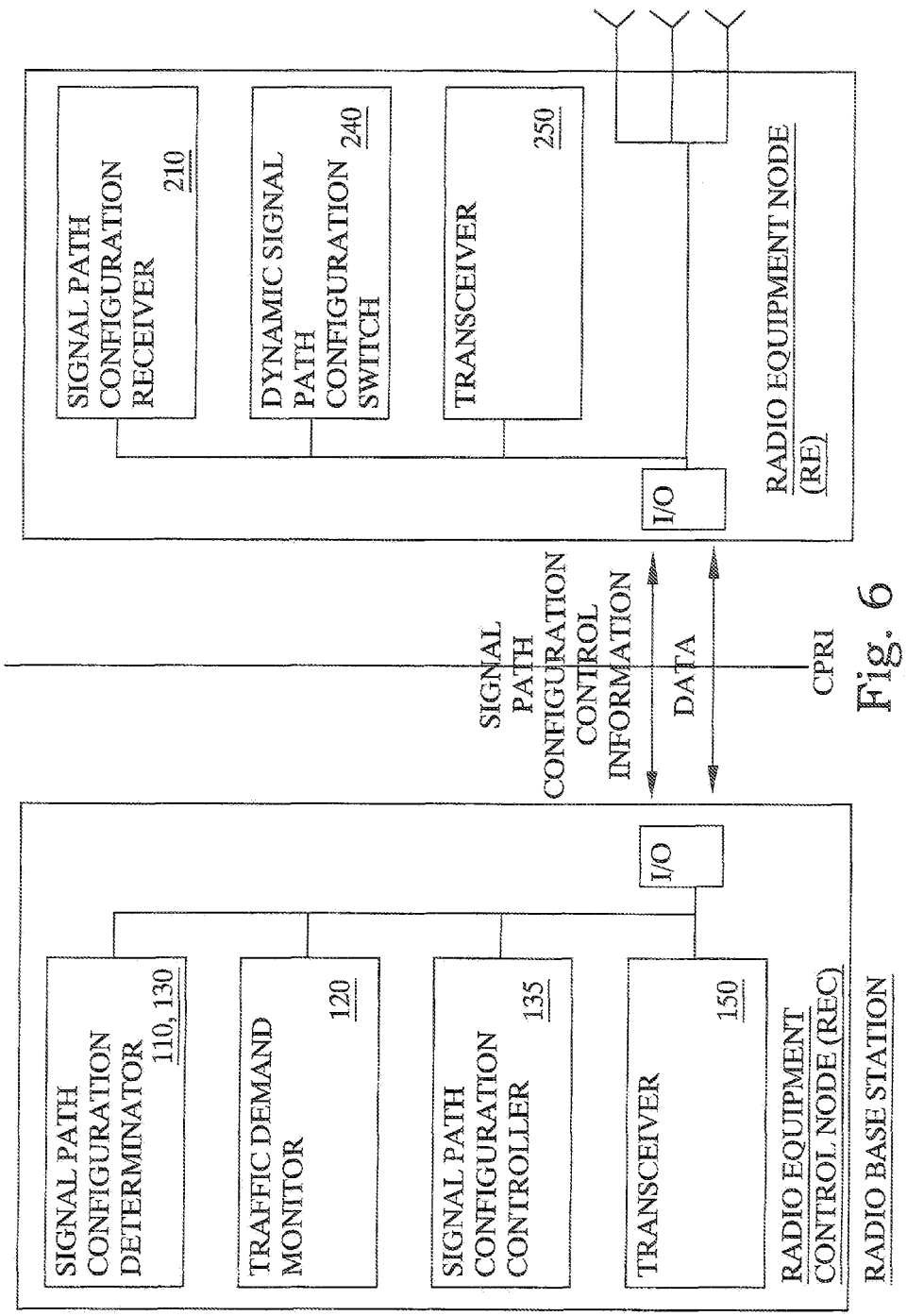
FIG. 6 is an illustration of an embodiment of a radio equipment control node and a radio equipment node according to the present disclosure.

An embodiment of a radio equipment control node will be described below with reference to FIG. 6.

The radio equipment control (REC) node is separate from and coupled to a plurality of radio equipment (RE) nodes by a common transmission link (CPRI), and includes a common transmission interface defining a common transmission protocol for the common transmission link. In addition the radio equipment control node is provided with all functionality necessary to process signals and communicate with radio equipment nodes according to known measures. According to the present embodiment, the radio equipment control node REC includes a signal path configuration determinator 110 for determining and providing an initial signal path configuration to at least one of its plurality of radio equipment (RE) nodes. Each such signal path configuration defines a combination of at least one of a set of available signal paths to be mapped onto multiple antenna elements associated with the at least one radio equipment (RE) node and a bandwidth capability for the at least one radio equipment (RE) node. In addition, the radio equipment control node includes a monitor 120 for monitoring a traffic demand for a respective cell of the at least one radio equipment (RE) node. To enable the radio equipment control node to control and switch between signal path configurations, it includes a dynamic signal path configuration determinator 130 which determines an alternative signal path configuration for the at least one radio equipment (RE) node based on at least the monitored load/demand and (optionally) at least one of an available set of signal path configurations for the radio equipment (RE) node. In the FIG. 6, this is indicated in the same box as the initial signal path configuration determinator. However, it is equally to provide the unit as a separate entity within the radio equipment control node or in a separate node.

Further, the radio equipment control mode includes a signal path configuration controller 135 for providing the determined alternative signal path configuration to the at least one radio equipment (RE) node over the CPRI interface to instruct the at least one radio equipment (RE) node to switch signal path configuration. Finally, the radio equipment control node includes a transceiver 150 configured for exchanging data e.g. IQ samples with the at least one radio equipment (RE) node based on the alternative signal path configuration.

According to a further embodiment, the dynamic signal path configuration determinator 130 is configured to receive an indication of the plurality of available signal path configurations from the radio equipment (RE) node.

An embodiment of a radio equipment node will be described below with reference to FIG. 6.

The radio equipment (RE) node is separate from and coupled to a radio equipment control (REC) node by a communication link, and includes multiple antenna elements for transceiving information over a radio interface and at least one interface (CPRI) configured for communication with the radio equipment control (REC) node and at least one of a plurality of radio equipment (RE) nodes. In addition the radio equipment node includes a signal path configuration receiver 210 configured to receive and activate a provided initial signal path configuration from the radio equipment control node.

The initial signal path configuration defines a combination of at least one of a set of available signal paths to be mapped onto the multiple antenna elements and a bandwidth capability. Further, the radio equipment node includes a switch 240 configured to switch from the activated initial signal path configuration to an alternative signal path configuration in response to a received alternative signal path configuration and a transceiver 250 configured for exchanging data with the radio equipment control (REC) node based on the alternative signal path configuration.

According to a further embodiment, the radio equipment node is configured to provide a set of available signal path configurations to the radio equipment control node to support the determination of the alternative signal path configuration. This can typically be provided during a first initiation process between the radio equipment control node and the radio equipment, or be provided upon request from the radio equipment control node.

Figure 7:
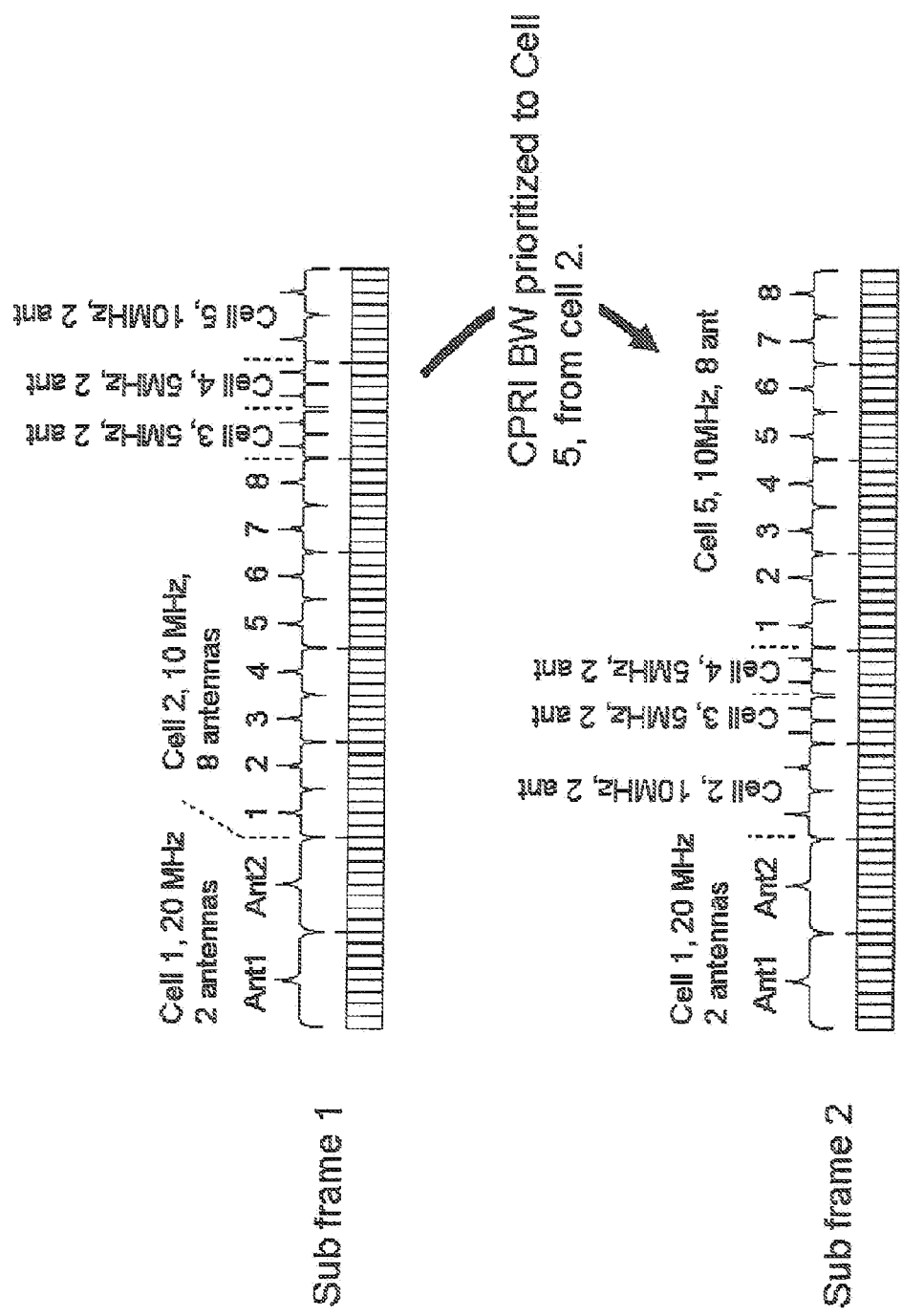
FIG. 7 is an illustration of the utilization of the embodiments of the method according to the present invention.

An example of the result on CPRI usage of the switch from one signal path configuration to an alternative signal path configuration will be described with reference to the frames shown in FIG. 7. The CPRI IQ field usage at the two exemplary sub frames show how an initial signal path configuration can be changed into an alternative signal path configuration. The example shows a distributed radio base station where five radio equipment are cascaded and the CPRI has a bandwidth of 10 Gbps. In sub frame 2 CPRI bandwidth has been prioritized from cell 2 to cell 5. Initially, cell 2 is allocated 8 antennas with a bandwidth of 10 MHz each, whereas cell 5 is allocated 2 antennas with a bandwidth of 10 MHz each. After the signal path configuration has been switched, cell 2 has been allocated 2 antennas with a bandwidth of 10 MHz each and cell 5 has been allocated 8 antennas with a bandwidth of 10 MHz each. All other cells are left with unchanged signal path configurations. This switch may have been performed based on an increase in traffic demand in cell 5, or a reduced traffic demand in cell 2, or potentially based on a need to balance a traffic demand in all cells.

Figure 8:
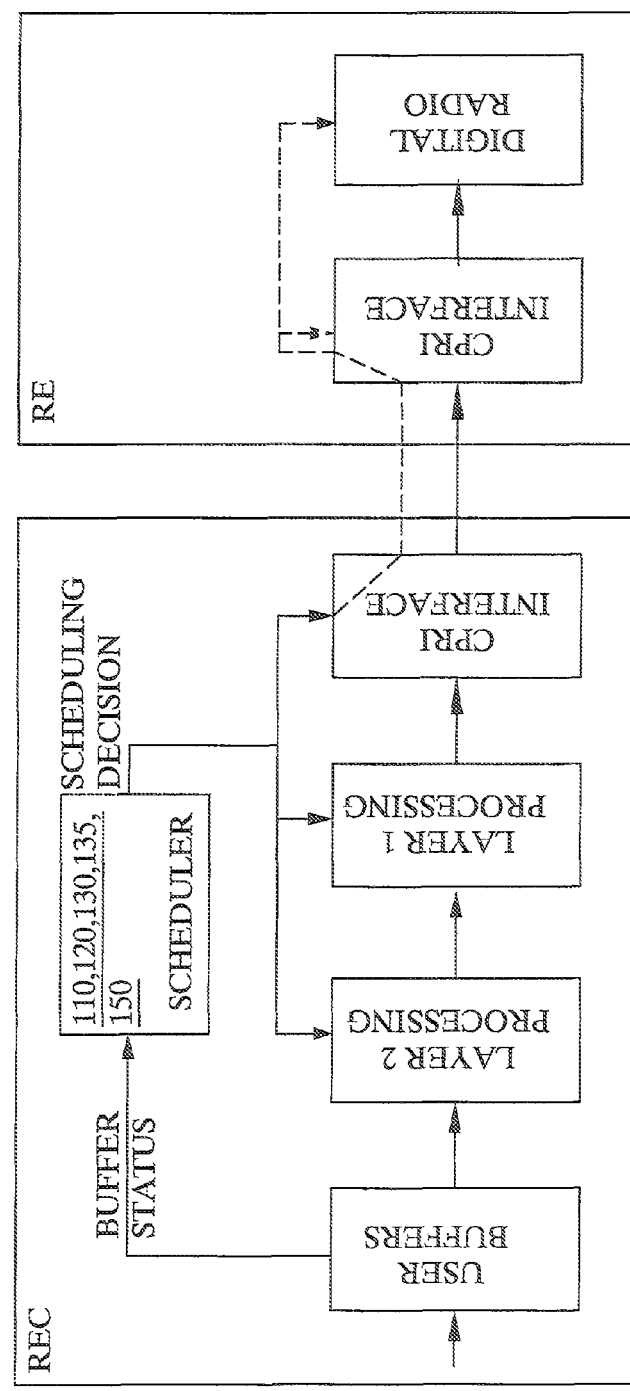
FIG. 8 is an illustration of a further embodiment of a radio equipment control node and a radio equipment node according to the present disclosure.

A particular embodiment of a radio equipment control (REC) node according to the present disclosure will be described with reference to FIG. 8.

In a known manner, the radio equipment control node includes functionalities relating to user buffers, layer 2 processing, layer 1 processing and CPRI interface, and a MAC scheduler. According to the present invention, the MAC scheduler of the radio equipment control node is made aware of the total available CPRI bit rate to/from a number of sectors or cells. Based on the current traffic situation e.g. demand in the sectors, the scheduler selects the optimal usage of the available CPRI rate. Typically, the physical processing of the scheduler is software controlled. The IQ samples to send are generated from software controlled IFFT, which can be configured to process different number of IFFT for a sector and a different bandwidth for a sector. The FFT and IFFT resources are pooled, as well as the interface between the IFFT/FFT pool and the CPRI ports. The physical layer processing pooling is another benefit of the virtual signal path configuration according to the present disclosure. The selected signal path configuration is provided to the radio equipment node through the CPRI interface, as indicated by the dotted lines.

An example of the utilization of the embodiments of the present disclosure, is to define groups of radio equipment nodes which switch configuration of virtual path on a regular basis. For instance, a group of three radio equipment nodes can share the physical layer processing and CPRI interface resources adequate to process 12 antenna streams. In a LTE frame, consisting of 10 sub frames of 1 ms each, two sub frames are allocated to each radio equipment node for 8 branch configurations, and the remaining 4 are configured for 4 branch use in each radio equipment node. The allocation for RE 1 could be: sub frame 0 and 4 have 8 IQ streams, sub frame 3, 7, 8, 9 have 4 IQ streams and sub frames 1, 2, 5, 6 have 2 IQ streams. This would allow the radio equipment control node to schedule particularly demanding users (weak or subject to strong interference) served by the RE 1 in sub frames 0 and 4, normal users in sub frames 3, 7, 8, 9 and less demanding users in sub frames 1, 2, 5, 6.

Another exemplary usage of the invention is to select the most urgent transmission first, do a link adaptation, determine the amount of bandwidth and beam forming control needed for the transmission, and thus the required physical layer processing, and CPRI interface bit rate. The RE serving that user is then allocated the corresponding physical layer processing and CPRI interface bit rate. The processing then continues with the second most urgent transmission, allocating its parts. When all resources are allocated, the scheduling determines which users are capable and suitable to serve based on the allocated resources. REs with multiple IQ streams are capable of transmitting to demanding users (also non-urgent), REs with large bandwidth are capable of transmitting large amounts of best effort data.

The radio equipment control node is adapted to signal or provide control information relating to the determined alternative signal path configuration to the radio equipment node. This control information typically includes which signal path configuration to use for a coming sub frame, both uplink and downlink. Optionally, the control information may include an alternative CPRI placement of the signal path data, if this is not statistically configured per signal path. To enable switching signal path configuration on a sub frame basis this control information needs to be exchanged on a sub frame basis as well, at least upon a change of signal path configuration. According to a particular embodiment, the control information is mapped onto a vendor specific part of the CPRI control words, but could optionally be mapped onto the C&M link or embedded in the IQ field.

Figure 9:
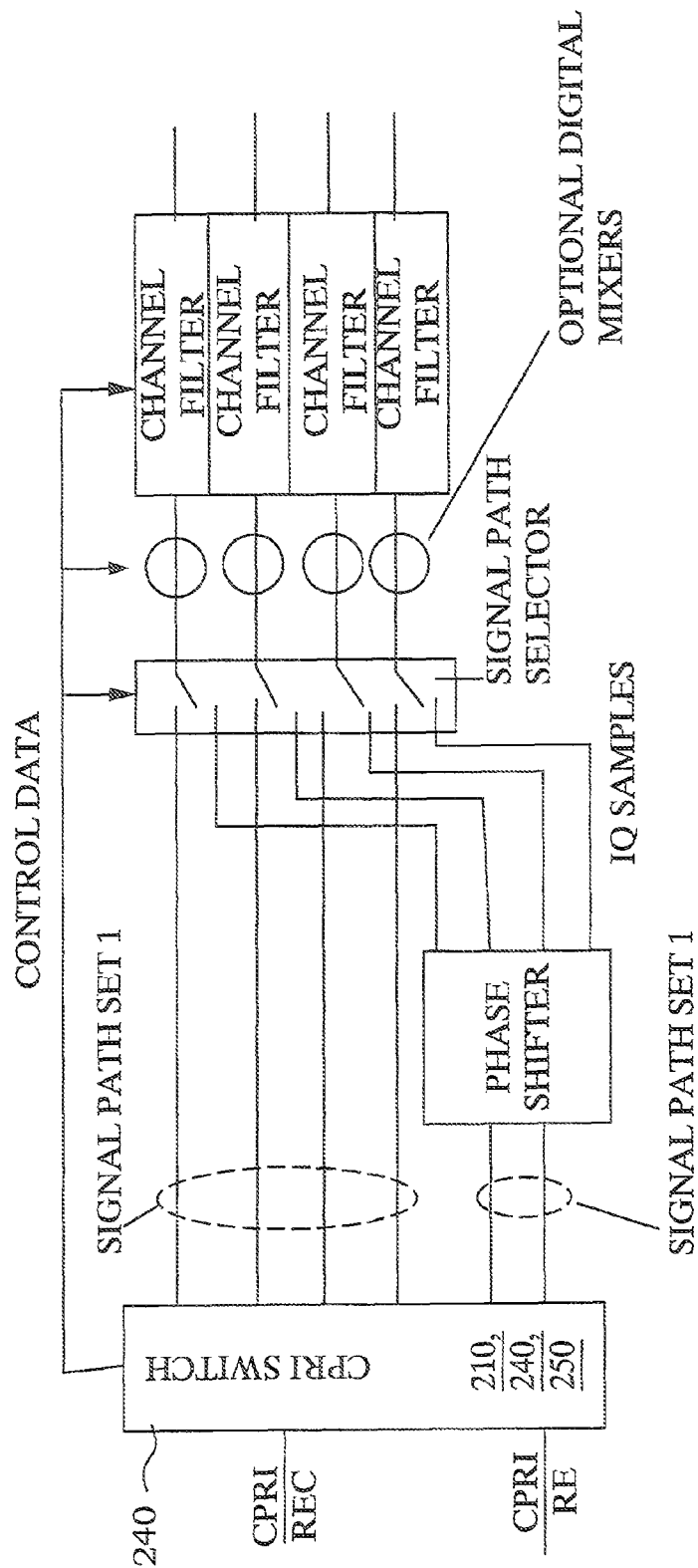
FIG. 9 is an illustration of yet another embodiment of a radio equipment node according to the present disclosure.

A particular embodiment of a radio equipment node according to the present disclosure will be described with reference to FIG. 9. For simplicity reasons the embodiment of a radio equipment control in FIG. 9 illustrates a case of four antenna elements at the radio equipment control. However, the same principle is applicable to any number of antennas, e.g. and particularly to the case of eight antenna elements as discussed previously. The illustration shows a case of two signal path configuration sets, wherein set 1 has direct control of each radio and set 2 uses two patterns, defined by the phase shifter matrix.

Consequently, the radio equipment control includes a virtual signal path termination hardware. The original four branches through the radio will still exist. In addition, a digital beam forming processing unit is included, which is illustrated by the phase shifter and the signal path selector units respectively in FIG. 9. The digital beam forming processing unit takes a virtual signal path branch and inserts that on the original branches, with suitable phase and amplitude modification.

The radio equipment node is also configured to retrieve a subset of the IQ samples as compared to the full bandwidth based on a provided alternative signal path configuration. For instance, only two samples instead of eight samples are extracted for a stream. This is done by the CPRI Switch in FIG. 9.

Further, the radio equipment node is configured to be able to change the number of samples extracted from the CPRI link by changing a signal path configuration on sub frame level. Optionally, the radio equipment is equipped with a digital mixer (for each antenna element) which can select which part of the full bandwidth to put the limited bandwidth on. Alternatively, it is always put in the center part.

Prior art radio equipment nodes are not able to change bandwidth on a sub frame basis e.g. millisecond basis, as the new bandwidth potentially requires a change of channel filter and consequently a change of filter latency. This is the case if a lower bandwidth is selected as compared to a higher initial bandwidth. In order to support the radio equipment node according to the present disclosure there are two alternatives. In a first alternative, the radio channel filters are provided with equal latency, and an extra low pass filter is added to enable the switch to have insignificant transients e.g. reduce any difference in latency between channel filters. In a second alternative, the radio channel filters are left unchanged with relation to prior art radio equipment. In this case, the lower bandwidth will not meet the strict spectrum requirements in the standard as specified for a particular operating bandwidth, but that is of no importance as the wider spectrum is owned by the operator and that spectrum mask is still met.

Further, the radio equipment node includes a CPRI switch, which is capable of at least forwarding all IQ slots received from the radio equipment control node to the downstream radio equipment nodes, and inserting own IQ samples in IQ slots in the flow from the downstream radio equipment node towards the radio equipment control.

The steps, functions, procedures, and/or blocks described above may be implemented in hardware using any conventional technology, such as discrete circuit or integrated circuit technology, including both general-purpose electronic circuitry and application-specific circuitry. Alternatively, at least some of the steps, functions, procedures, and/or blocks described above may be implemented in software for execution by a suitable processing device, such as a microprocessor, Digital Signal Processor (DSP) and/or any suitable programmable logic device, such as a Field Programmable Gate Array (FPGA) device.

It should also be understood that it might be possible to re-use the general processing capabilities of the network nodes. For example this may, be performed by reprogramming of the existing software or by adding new software components.

The software may be realized as a computer program product, which is normally carried on a computer-readable medium. The software may thus be loaded into the operating memory of a computer for execution by the processor of the computer. The computer/processor does not have to be dedicated to only execute the above-described steps, functions, procedures, and/or blocks, but may also execute other software tasks.

Figure 10:
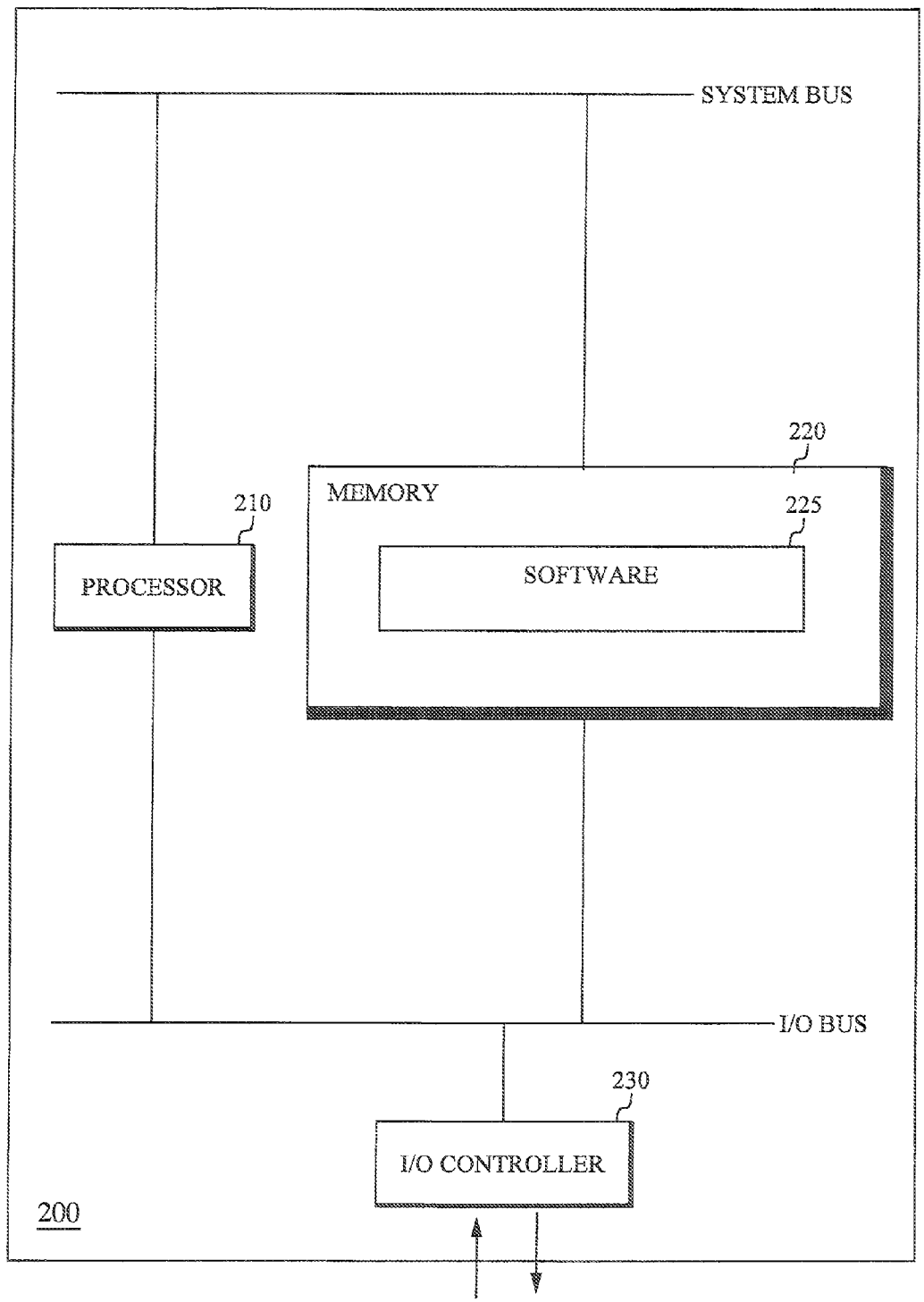
FIG. 10 is an illustration of an example computer-implementation according to the present disclosure.

In the following, an example of a computer-implementation will be described with reference to FIG. 10. A computer 200 comprises a processor 210, an operating memory 220, and an input/output unit 230. In this particular example, at least some of the steps, functions, procedures, and/or blocks described above are implemented in software 225, which is loaded into the operating memory 220 for execution by the processor 210. The processor 210 and memory 220 are interconnected to each other via a system bus to enable normal software execution. The I/O unit 230 may be interconnected to the processor 210 and/or the memory 220 via an I/O bus to enable input and/or output of relevant data such as input parameter(s) and/or resulting output parameter(s).

Some of the advantages presented by the embodiments of the present disclosure are a more efficient use of the bandwidth on the interface between the base band hotel and the radio equipment nodes, especially when combined with adaptive antennas. Further, the embodiments enable reducing base band processing in the base band hotel.

The embodiments described above are to be understood as a few illustrative examples of the present invention. It will be understood by those skilled in the art that various modifications, combinations, and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method for use in a distributed radio base station, comprising a plurality of radio equipment nodes and an associated radio equipment control node, for exchanging user data between said radio equipment control node and said plurality of radio equipment node for transceiving information over a radio interface in a cell using multiple antenna elements, the radio equipment control node being separate from and coupled to said plurality of radio equipment nodes by a transmission link (CPRI), said method comprising:
said transmission link (CPRI) comprising a CPRI interface with a total available bit rate, and said user data comprising In-phase and Quadrature (IQ) complex data samples;
configuring at least one of said radio equipment nodes with a initial signal path configuration, said signal path configuration defining a combination of at least one of a set of available signal paths to be mapped onto said multiple antenna elements together with a bandwidth capability for said at least one radio equipment node;
monitoring a traffic demand of a respective cell of each of said plurality of radio equipment nodes;
determining an alternative signal path configuration for said at least one radio equipment node based on at least said monitored demand, said alternative signal path configuration defining a different combination of at least one of a said set of available signal paths to be mapped onto one of said multiple antenna elements together with a bandwidth capability for said at least one radio equipment node;
dynamically switching from said initial signal path configuration to said determined alternative signal path configuration;
exchanging said IQ data samples between said radio equipment control node and said at least one radio equipment node by inserting or extracting said IQ data samples to or from said CPRI interface based on said determined alternative signal path configuration.

2. The method according to claim 1, comprising dynamically switching from said initial signal path configuration to said determined alternative signal path configuration in response to a change in traffic demand in a cell.

3. The method according to claim 1, wherein said available signal paths comprising one or both of physical signal paths where one data stream is mapped onto each respective of said plurality of antenna elements, or virtual signal paths where each data stream is mapped onto all or a subset of said plurality of antenna elements.

4. The method according to claim 3, wherein said virtual paths comprising two data streams, wherein a first data stream is mapped onto a first subgroup of said plurality of antenna elements, and second data stream is mapped onto each of a second subgroup of said plurality of antenna elements.

5. The method according to claim 3, wherein said virtual signal path comprising beam forming.

6. The method according to claim 1, comprising determining said alternative signal path configuration based on physical processing limitations of said radio equipment control node.

7. The method according to claim 1, comprising performing said monitoring continuously.

8. The method according to claim 1, comprising performing said monitoring at predetermined intervals.

9. The method according to claim 8, characterized by adapting said predetermined intervals in response to rapid or large changes in said traffic demand.

10. A method in a radio equipment control node in a distributed radio base station, said distributed radio base station comprising a plurality of radio equipment node associated with said radio equipment control node, the radio equipment control node being separate from and coupled to said plurality of radio equipment nodes by a transmission link (CPRI), said method comprising:
said transmission link (CPRI) comprising a CPRI interface with a total available bit rate;
determining and providing an initial signal path configuration to at least one of said
associated radio equipment nodes, said signal path configuration defining a combination of at least one of a set of available signal paths to be mapped onto multiple antenna elements associated with said at least one radio equipment node together with a bandwidth capability for said at least one radio equipment node;
monitoring a traffic demand for a respective cell of each of said plurality of associated radio equipment nodes;
determining an alternative signal path configuration for said at least one radio equipment node based on at least said monitored traffic demand and an available set of signal paths and bandwidth capabilities for said radio equipment node;
providing said determined alternative signal path configuration to said at least one radio equipment node to instruct said at least one radio equipment to switch from said initial signal path configuration to said alternative signal path configuration;
exchanging user data with said at least one radio equipment node based on said determined alternative signal path configurations, said user data comprising In-phase and Quadrature (IQ) complex data samples that are inserted or extracted to or from said CPRI interface.

11. The method according to claim 10, comprising receiving an indication of a set of available signal paths and bandwidth capability from said at least one radio equipment node.

12. The method according to claim 10, comprising determining said alternative signal path configuration by balancing the traffic demand for a plurality of cells.

13. A method in a radio equipment node in a distributed radio base station, said distributed radio base station comprising a plurality of radio equipment nodes associated with a radio equipment control node, said radio equipment control node being separate from and coupled to the plurality of radio equipment nodes by a transmission link (CPRI), said method comprising:
said transmission link (CPRI) comprising a CPRI interface with a total available bit rate;
receiving and activating an initial signal path configuration, said initial signal path configuration defining a combination of at least one of a set of available signal paths to be mapped onto multiple antenna elements associated with said radio equipment node together with a bandwidth capability for said radio equipment node;

receiving a provided alternative signal path configuration and ordering a switch from said initial signal path configuration to said alternative signal path configurations;

switching to and activating said alternative signal path configuration for transceiving information over a radio interface;

exchanging user data with said radio equipment control node based on said one of a plurality of alternative signal path configurations, said user data comprising In-phase and Quadrature (IQ) complex data samples that are inserted or extracted to or from said CPRI interface.

14. The method according to claim 13, comprising providing an indication of a set of available signal paths and a bandwidth capability to said radio equipment control node.

15. Radio equipment node for use in a distributed radio base station that includes a radio equipment control node separate from and coupled to a plurality of radio equipment nodes by a communication link, said radio equipment node comprising multiple antenna elements for transceiving information over a radio interface and at least one interface (CPRI) configured for communication with said radio equipment control node and at least one of said plurality of radio equipment nodes, said radio equipment node comprising:

said transmission link (CPRI) comprising a CPRI interface with a total available bit rate;

a signal path configuration receiver configured to receive and activate a provided initial signal path configuration, said signal path configuration defining a combination of at least one of a set of available signal paths to be mapped onto said multiple antenna elements together with a bandwidth capability for said radio equipment node;

a switch configured to switch from an activated initial signal path configuration to an alternative signal path configuration in response to a received alternative signal path configuration;

a transceiver configured for exchanging data with said radio equipment control node based on said alternative signal path configuration, said user data comprising In-phase and Quadrature (IQ) complex data samples that are inserted or extracted to or from said CPRI interface.

16. The radio equipment according to claim 15, wherein said node is configured to signal an indication of a plurality of available signal path configurations to said radio equipment control node.

17. A distributed radio base station comprising a radio equipment control (REC) node and a plurality of radio equipment nodes including multiple antenna elements according to claim 15.

18. Radio equipment control node for use in a distributed radio base station that includes a plurality of radio equipment nodes with multiple antenna elements, the radio equipment control node being separate from and coupled to said plurality of radio equipment nodes by a transmission link, and comprising a transmission interface defining a common transmission protocol for the transmission link (CPRI), said radio equipment control node comprising:

said transmission link (CPRI) comprising a CPRI interface with a total available bit rate;

a signal path configuration determinator for determining and signaling an initial signal path configuration to at least one of said plurality of radio equipment nodes, said signal path configuration defining a combination of at least one of a set of available signal paths to be mapped onto multiple antenna elements associated with said at least one radio equipment node together with a bandwidth capability for said at least one radio equipment node;

a demand monitor for monitoring a demand for a respective cell of said at least one radio equipment node;

a dynamic signal path configuration determinator for dynamically determining an alternative signal path configuration for said at least one radio equipment node based on at least said monitored load/demand and (optionally) at least one of an available set of signal path configurations for said radio equipment node;

a signal path configuration control for signaling said determined alternative signal path configuration to said at least one radio equipment node to instruct said at least one radio equipment node to switch from said initial signal path configuration to said alternative signal path configuration;

a transceiver configured for exchanging data with said at least one radio equipment node based on said alternative signal path configuration, said user data comprising In-phase and Quadrature (IQ) complex data samples that are inserted or extracted to or from said CPRI interface.

19. The radio equipment control node according to claim 18, wherein said dynamic signal path configuration determinator is configured to receive an indication of said plurality of available signal path configurations from said radio equipment node.

* * * * *